US012719804B2

(12) United States Patent
Kumar et al.

(10) Patent No.: US 12,719,804 B2
(45) Date of Patent: Aug. 25, 2026

(54) CONTEXT-BASED ANALYSIS FOR DATA PACKET PRIORITIZATION

(71) Applicant: Dell Products L.P., Round Rock, TX (US)

(72) Inventors: Avinash Kumar, Patna (IN); Ophir Buchman, Raanana (IL); Yevgeni Gehtman, Modi'in (IL)

(73) Assignee: Dell Products L.P., Round Rock, TX (US)

( * ) Notice: Subject to any disclaimer, the term of this patent is extended or adjusted under 35 U.S.C. 154(b) by 61 days.

(21) Appl. No.: 18/912,487

(22) Filed: Oct. 10, 2024

(65) Prior Publication Data

US 2026/0106835 A1 Apr. 16, 2026

(51) Int. Cl.
*G06F 13/00* (2006.01)
*H04L 47/2475* (2022.01)
*H04L 47/2483* (2022.01)
*H04L 47/43* (2022.01)

(52) U.S. Cl.
CPC ...... *H04L 47/2475* (2013.01); *H04L 47/2483* (2013.01); *H04L 47/43* (2022.05)

(58) Field of Classification Search
CPC .. H04L 47/2475; H04L 47/2483; H04L 47/43
USPC ......................... 709/240, 238, 235, 234, 246
See application file for complete search history.

(56) References Cited

U.S. PATENT DOCUMENTS 10,491,529 B2 * 11/2019 Baldi ...................... H04L 45/38
12,278,769 B2 * 4/2025 Su ........................... H04L 47/24
2011/0286331 A1 * 11/2011 Lauer .................... H04W 28/02 370/328
2019/0007327 A1 * 1/2019 Baldi ...................... H04L 45/64
2023/0224251 A1 * 7/2023 Su ....................... H04L 47/2433 370/235

* cited by examiner

*Primary Examiner* — Kenneth R Coulter
(74) *Attorney, Agent, or Firm* — Amin, Turocy & Watson, LLP

(57) ABSTRACT

A system can receive a group of data packets originated by at least one edge device. The system can decrypt respective data packets of the group of data packets, to reconstruct a file that is represented by the group of data packets. The system can extract a contextual value of the file. The system can input the respective contextual values and a defined rulebook to a retrieval-augmented generation system, wherein the defined rulebook comprises rules applicable to traffic routing in a human-readable format, and wherein the retrieval-augmented generation system outputs a priority for transmission of the group of data packets. The system can transmit the group of data packets to a destination based on the priority and the defined rulebook.

20 Claims, 10 Drawing Sheets

602

RECEIVING A GROUP OF DATA PACKETS ORIGINATED BY AT LEAST ONE EDGE DEVICE 604

DECRYPTING RESPECTIVE DATA PACKETS OF THE GROUP OF DATA PACKETS, TO RECONSTRUCT A FILE THAT IS REPRESENTED BY THE GROUP OF DATA PACKETS 606

EXTRACTING A CONTEXTUAL VALUE OF THE FILE 608

INPUTTING THE RESPECTIVE CONTEXTUAL VALUES AND A DEFINED RULEBOOK TO A RETRIEVAL-AUGMENTED GENERATION SYSTEM, WHEREIN THE DEFINED RULEBOOK COMPRISES RULES APPLICABLE TO TRAFFIC ROUTING IN A HUMAN-READABLE FORMAT, AND WHEREIN THE RETRIEVAL-AUGMENTED GENERATION SYSTEM OUTPUTS A PRIORITY FOR TRANSMISSION OF THE GROUP OF DATA PACKETS 610

TRANSMITTING THE GROUP OF DATA PACKETS TO A DESTINATION BASED ON THE PRIORITY AND THE DEFINED RULEBOOK 612

614

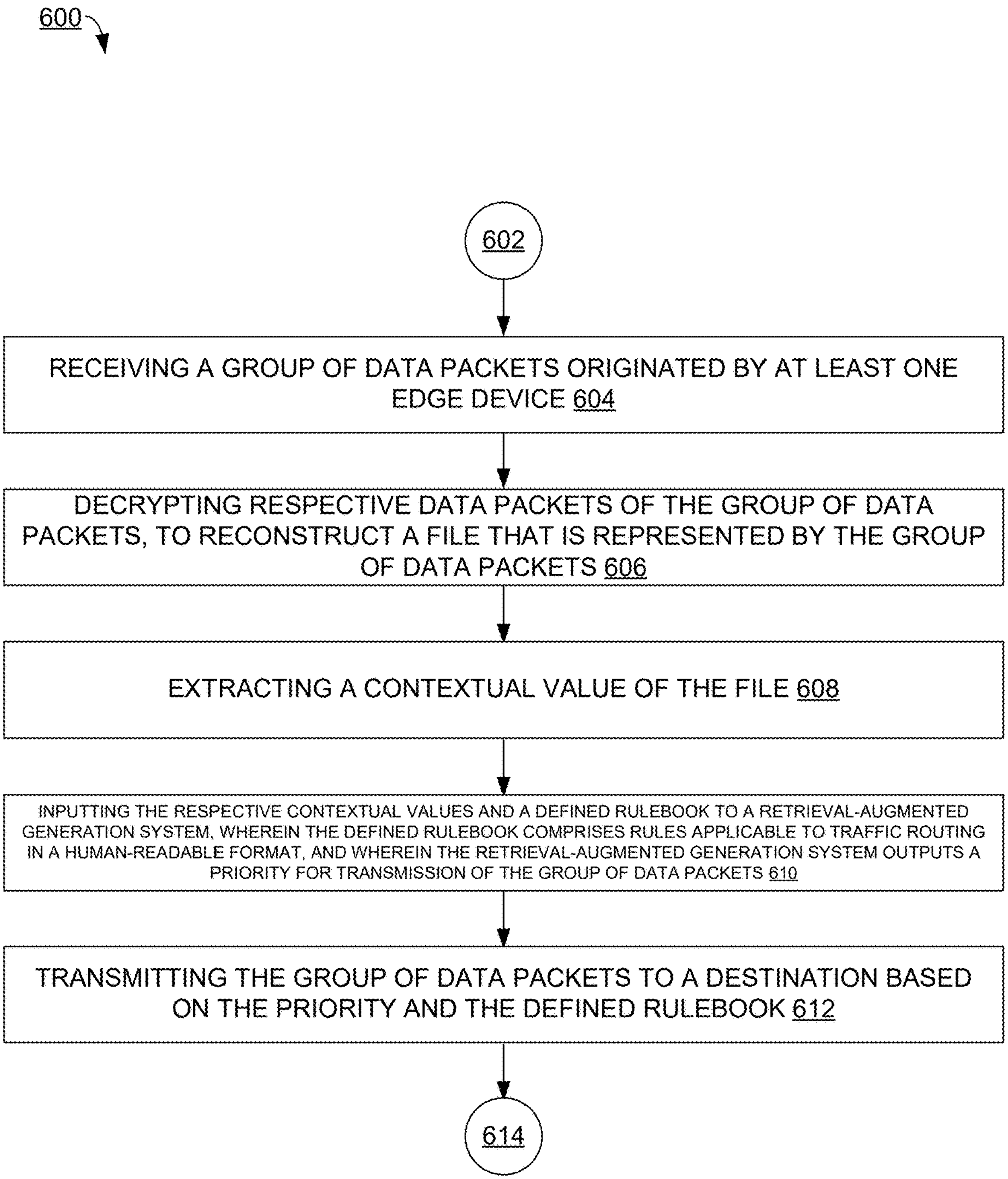

FIG. 6

EXTRACTING A CONTEXTUAL VALUE OF A FILE THAT IS RECONSTRUCTED FROM A GROUP OF DATA PACKETS, WHEREIN THE GROUP OF DATA PACKETS ARE ENCRYPTED IN A COURSE OF TRANSMITTING THE GROUP OF DATA PACKETS 904

INPUTTING THE CONTEXTUAL VALUE TO A RETRIEVAL-AUGMENTED GENERATION SYSTEM, AND A DEFINED RULEBOOK TO THE RETRIEVAL-AUGMENTED GENERATION SYSTEM, WHEREIN THE DEFINED RULEBOOK EXPRESSES RULES FOR TRAFFIC ROUTING IN A HUMAN-READABLE FORMAT, AND WHEREIN THE RETRIEVAL-AUGMENTED GENERATION SYSTEM OUTPUTS A PRIORITY FOR TRANSMITTING THE RESPECTIVE DATA PACKETS 906

TRANSMITTING THE GROUP OF DATA PACKETS TO A DESTINATION BASED ON THE PRIORITY 908

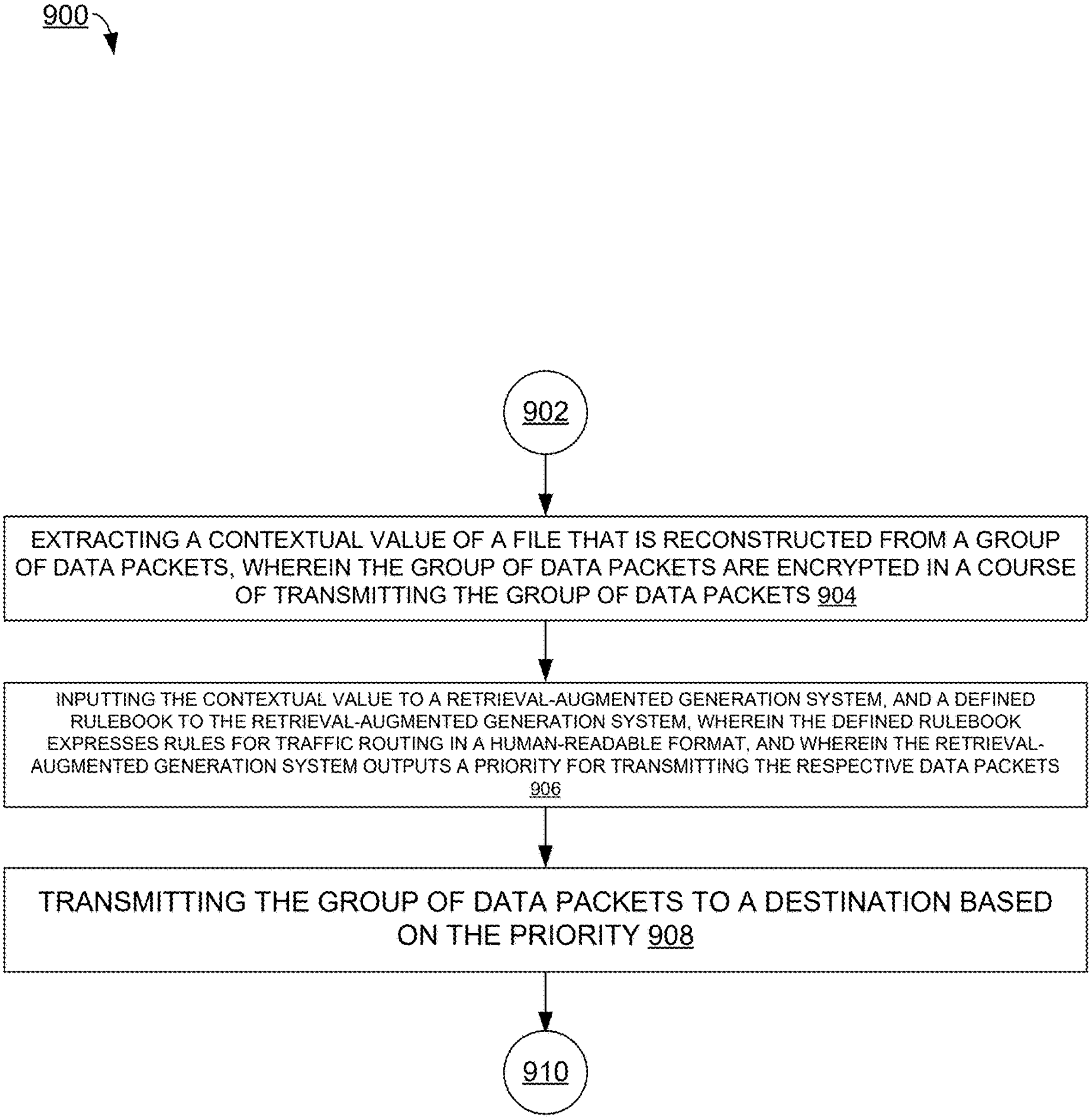

FIG. 9

CONTEXT-BASED ANALYSIS FOR DATA PACKET PRIORITIZATION

BACKGROUND

Computer data packets can be transmitted between computers, and the transmission of some data packets can be prioritized relative to the transmission of other data packets.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive a group of data packets originated by at least one edge device. The system can decrypt respective data packets of the group of data packets, to reconstruct a file that is represented by the group of data packets. The system can extract a contextual value of the file. The system can input the respective contextual values and a defined rulebook to a retrieval-augmented generation system, wherein the defined rulebook comprises rules applicable to traffic routing in a human-readable format, and wherein the retrieval-augmented generation system outputs a priority for transmission of the group of data packets. The system can transmit the group of data packets to a destination based on the priority and the defined rulebook.

An example method can comprise decrypting, by a system comprising at least one processor, respective data packets of a group of data packets, to reconstruct a file that is represented by the group of data packets. The method can further comprise extracting, by the system, a contextual value of the file. The method can further comprise inputting, by the system, the file and a defined rulebook to a retrieval-augmented generation system, wherein the defined rulebook expresses rules applicable to traffic routing in a human-readable format, and wherein the retrieval-augmented generation system outputs a priority for transmission of the respective data packets. The method can further comprise transmitting, by the system, the group of data packets to a destination based on the priority.

An example non-transitory computer-readable medium can comprise instructions that, in response to execution, cause a system comprising a processor to perform operations. These operations can comprise extracting a contextual value of a file that is reconstructed from a group of data packets, wherein the group of data packets are encrypted in a course of transmitting the group of data packets. These operations can further comprise inputting the contextual value to a retrieval-augmented generation system, and a defined rulebook to the retrieval-augmented generation system, wherein the defined rulebook expresses rules for traffic routing in a human-readable format, and wherein the retrieval-augmented generation system outputs a priority for transmitting the respective data packets. These operations can further comprise transmitting the group of data packets to a destination based on the priority.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates an example process flow that can facilitate context-based analysis for data packet prioritization, in accordance with an embodiment of this disclosure;

FIG. 9 illustrates another example process flow that can facilitate context-based analysis for data packet prioritization, in accordance with an embodiment of this disclosure.

DETAILED DESCRIPTION

Overview

Figure 1:
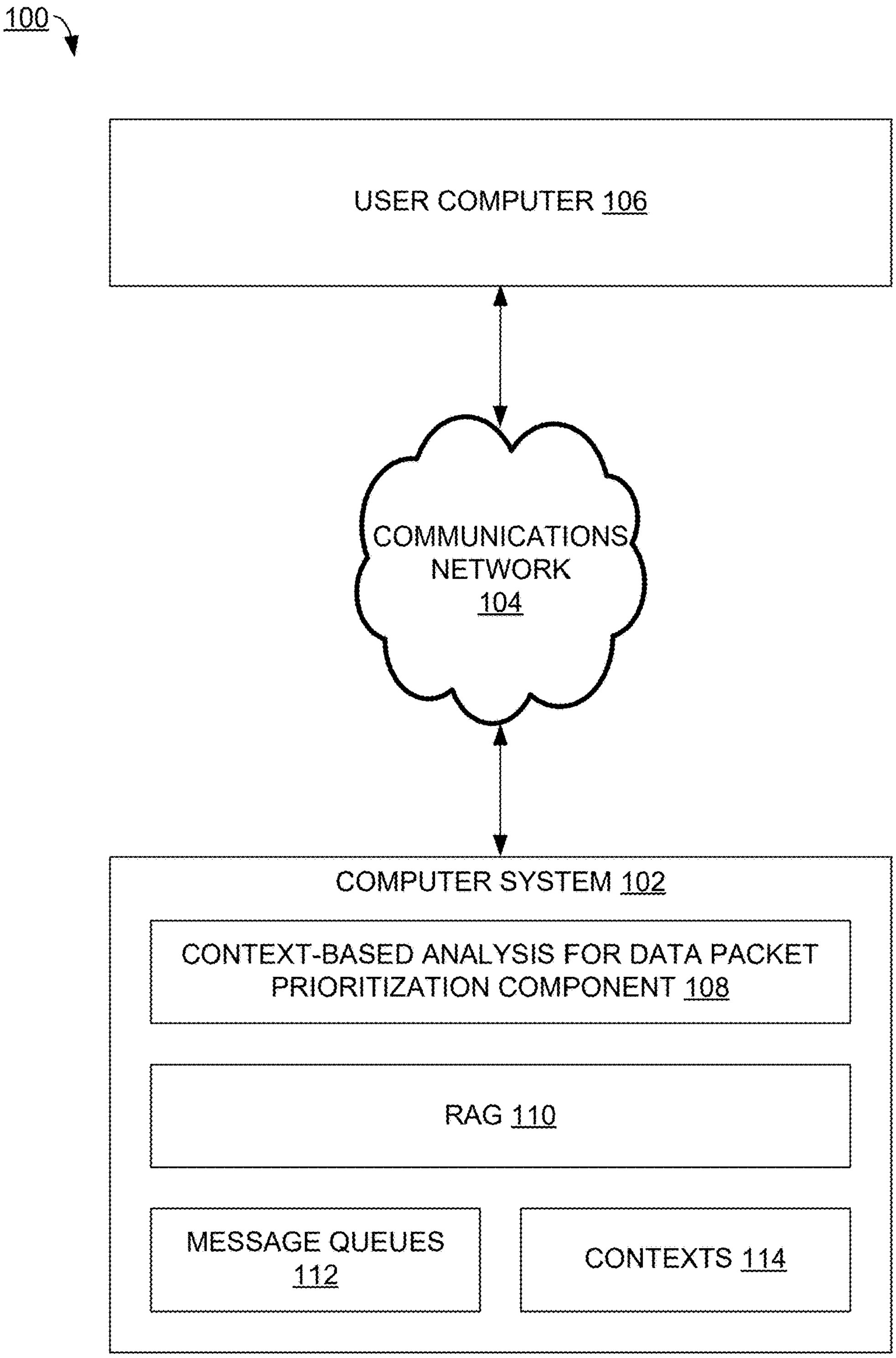
FIG. 1 illustrates an example system architecture that can facilitate context-based analysis for data packet prioritization, in accordance with an embodiment of this disclosure.

Message queue congestion can be a common problem, and it can become critical when it results in a delayed response to message requests during synchronous communication. It can be that even the smallest delay can have a huge impact, and lead to unexpected situations that can affect a patient's life or an organization's overall decision-making. Therefore, it can be important to have mechanisms to handle such congestions, in an efficient manner. Implementing these mechanisms can prevent potentially severe consequences.

Moreover, a cloud computing environment with a single customer can have multiple applications. Managing message requests effectively can be important, where the customer has an "in-depth understanding" of how prioritization should work between various applications and their numerous messages, while the vendor lacks that visibility.

That is, it can be that time-based or critical-context-based requests should be prioritized over requests.

For instance, in a global banking client environment, during morning hours in India, it can be that message traffic from a banking server serving Indian clients should take precedence over traffic from an American client's banking server due to the time zone difference. However, it can be that this prioritization does not mean that the message traffic from the Indian banking server can be always more important than that from the American server. The priority can be determined based on the context of the time zone. For example, during weekends, when the bank can be closed, message traffic priorities can shift accordingly to other applications, which do operate during the weekend, demonstrating a dynamic nature of prioritization based on contextual factors.

The present techniques address how to prioritize message queues based on actual granular-level context of a message packet in a dynamic cloud computing environment with a single customer.

Prior approaches have mechanisms for high-level context analysis. They can operate in a static manner and at a very high level, such as the application, user, or asset level. This can mean that the analysis considers the broader context rather than delving into the granular details within individual message packets. Consequently, these mechanisms can miss critical and specific priorities at the in-depth granular level, which can be essential for effective and accurate queue prioritization.

In prior approaches, producers can be user interface (UI) components that a user interacts with to initiate a request (e.g., a backup/restore request), and they act as producers in this scenario. For example, when the user clicks a button or takes an action in the UI to trigger the backup, it can generate a message or event indicating that a backup has been requested.

In prior approaches, backup server itself acts as a consumer, or a component within it responsible for handling backup requests acts as the consumer. It can listen for incoming requests/messages generated by the UI (the producer). When it receives a backup request message, it can initiate the backup process, possibly interacting with storage devices or other systems to perform the backup operation.

According to the present techniques, customers are the UI users who produce the message request (e.g., backup/restore requests) to be consumed by servers (e.g., backup servers) hosted on a cloud.

The present techniques provide a context-based prioritization mechanism that prioritizes data packets according to their context. This can go beyond simply reading the context as a whole; it can analyze the granular content of each packet to categorize its criticality. The detailed analysis can be then fed to the message broker to prioritize traffic effectively.

This mechanism can use a pre-defined rulebook to provide context-based prioritization rules. This capability an allow the dynamic processing of data packets.

The solution can involve a "proxy device" that leverages a shared public key mechanism to allow decryption and read data packets to understand their context and prioritize them correctly. It can leverage a retrieval augmented generation (RAG) engine, packets alongside their context, and the above-mentioned rulebook for reprioritization.

Each packet can be decrypted for inspection, and the unencrypted packet can be tagged with a relevant priority based on the rulebook.

An artificial intelligence (AI) analytical engine can dynamically categorize and prioritize packets by analyzing these variables, ensuring that critical content receives appropriate attention based on its context.

The present techniques can facilitate in-depth context-based analysis as part of a data packet prioritization process for more efficient and fine-tuned edge-to-cloud communications.

An example of the present techniques can occur where there is limited bandwidth, and an adult's work network traffic can be prioritized over a child's leisure network traffic. It can be a challenge for a user to specify this (e.g., "I want to prioritize my work traffic during working hours") in terms of routing rules. Working hours can depend based on the job, the country where the job is performed, and the time zone the person is in. For example, taking a banking company with branches around the world, those working hours can vary greatly from employee to employee.

In some examples, the present techniques can generally involve taking an input (e.g., audio, video, or text data) and inputting it into a RAG to output a vector. A similarity search can be performed between that vector and vectors in a database to find a similar vector that has already been classified, and from that, information of the input data (e.g., information inside a data packet) can be similarly classified.

In this manner, context-based routing rules can be declared, rather than technology-based rules, such as those that are specific to a port, an Internet Protocol (IP) address, and/or a user account.

A rulebook as described herein can define how data packets are to be prioritized. For example, at the end of a month, when inventory and wages are being determined, packets related to billing systems and customer relationship management (CRM) applications can be prioritized. During evenings, when employees are at home, data packets related to data backup and business intelligence (BI) applications/processes can be prioritized.

It can be that all messages begin with a neutral priority, so when a rule in the rulebook applies, the packet priority changes. Where no rules apply to a packet, that packet can keep its original (neutral) priority.

Message handling can by synchronized where a router defines an order of packets sent down a pipeline.

The present techniques can generally be applied to data packets (where a packet's metadata can be used to categorize the packet and understand its context). Additionally, the present techniques can extend to being able to read multiple packets, reconstruct their data, and analyse them (e.g., a large document segmented across multiple data packets due to its size). For example, certain documents can be considered to be more important if they were composed by certain individuals or discuss certain topics.

Prior approaches to rule-based data packet prioritization can generally apply to simple rules that can prioritize applications or specific senders (e.g., prioritize the packets coming from the company president's computer, or prioritize voice-over-internet-protocol (VoIP) call packets).

The present techniques can facilitate a deeper level of packet observation as compared to these prior approaches. The prior techniques can look at not just packets'metadata (headers), but also the packets' contents, reconstruct the data being transmitted (e.g., a document spread across multiple data packets), and make educated decisions from this information.

In a banking context, an example prioritization rule can be, "Traffic arriving from a bank branch should be prioritized if it arrives during its business hours." Other RAG-based rules according to the present techniques can include, "prioritize traffic related to stock trading transactions," and "lower the priority of non-banking-related traffic." Additionally, the present techniques can be implemented to block specific traffic based on its context, such as, "provide no priority for traffic to gambling websites."

In an example implementation of the present techniques, a company can use a generic RAG or a proprietary RAG to provide a provide a precise context for reading prompts and indexing data. A rule can be added to a rulebook stating a rule as free-form text. Packets can be decrypted and reconstructed, and the data from the packet can be indexed using the RAG. A prompt can compare (e.g., via a vector artificial neural network (ANN) algorithm) the data to stored data to determine whether the data fits the rule. That is, the present techniques can facilitate providing free-form rules that can prioritize the data based on its context (rather than metadata in prior approaches).

Packet metadata can comprise helpful information (such as source/destination IP address, port, timestamps, etc.) that can be used to facilitate packet prioritization. In the banking example above, packets are to be prioritized during a branch's business hours. In this example, packet metadata can help understand which bank branch originated a packet and when.

However, when a bank has hundreds of branches in multiple locations, the rulebook can become extensive.

In contrast, according to the present techniques, there can be a single rule that states, "prioritize network traffic from each bank branch during its business hours." This functionality can be lacking in prior approaches, and can be facilitated in the present techniques via use of a RAG.

Aside from metadata, the present techniques can facilitate describing a rule that states, "prioritize all accounting-related documents during the last two days of the month." This type of rule can involve analyzing the contents of data (rather than only its metadata).

In some examples, overhead associated with the present techniques can be mitigated or reduced. For example, a sender of data can send the data to a RAG and provide a reference to the processed data as part of the raw data packet. In such a scenario, it can be that a network device can merely perform a vector comparison as part of on-the-fly processing.

The present techniques can facilitate a deeper level of packet observation, compared to prior approaches. Beyond looking at metadata of packets (e.g., their headers), the contents of packets can be observed, where the data spread across multiple packets (e.g., a file split among multiple packets) can be reconstructed, and prioritization decisions can be made based on the contents.

In some examples, the present techniques can incorporate a human-readable rulebook. The present techniques can be dynamic in a way that an external RAG can be used for a contextual search. This approach can allow a user to upgrade/replace a contextual engine seamlessly (that is, without changing anything in a corresponding prioritization engine). The present techniques can facilitate altering the rulebook dynamically, and facilitate a user adapting its rulebook based on feedback (e.g., feedback from other users).

Example Architectures, Etc.

FIG. 1 illustrates an example system architecture 100 that can facilitate context-based analysis for data packet prioritization, in accordance with an embodiment of this disclosure.

System architecture 100 comprises computer system 102, communications network 104, and user computer 106. In turn, computer system 102 comprises context-based analysis for data packet prioritization component 108, RAG 110, message queues 112, and contexts 114.

Figure 10:
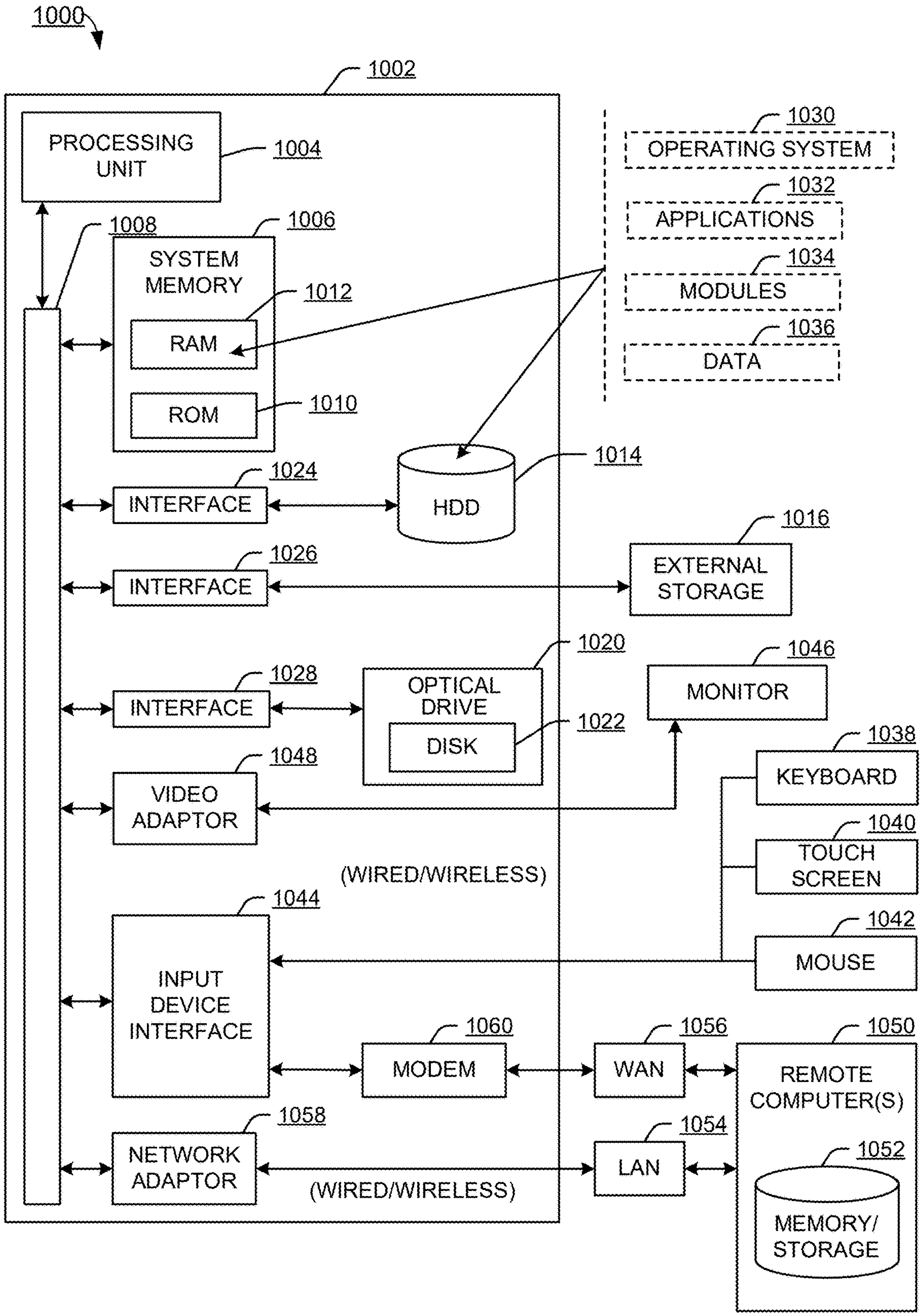
FIG. 10 illustrates an example block diagram of a computer operable to execute an embodiment of this disclosure.

Each of computer system 102 and/or user computer 106 can be implemented with part(s) of computing environment 1000 of FIG. 10. Communications network 104 can comprise a computer communications network, such as the Internet, or an isolated private computer communications network.

Computer system 102 can communicate with user computer 106 via communications network 104. This can involve transmitting and receiving data packets, which can be referred to as messages. Message queues 112 can comprise priority queues where messages are inserted according to a priority, and transmitted according to a priority. To determine which priority to assign a message, context-based analysis for data packet prioritization component 108 can use RAG 110 and contexts 114 as described herein.

In some examples, context-based analysis for data packet prioritization component 108 can implement part(s) of the process flows of FIGS. 6-9 to facilitate context-based analysis for data packet prioritization.

It can be appreciated that system architecture 100 is one example system architecture for context-based analysis for data packet prioritization, and that there can be other system architectures that facilitate context-based analysis for data packet prioritization.

Figure 2:
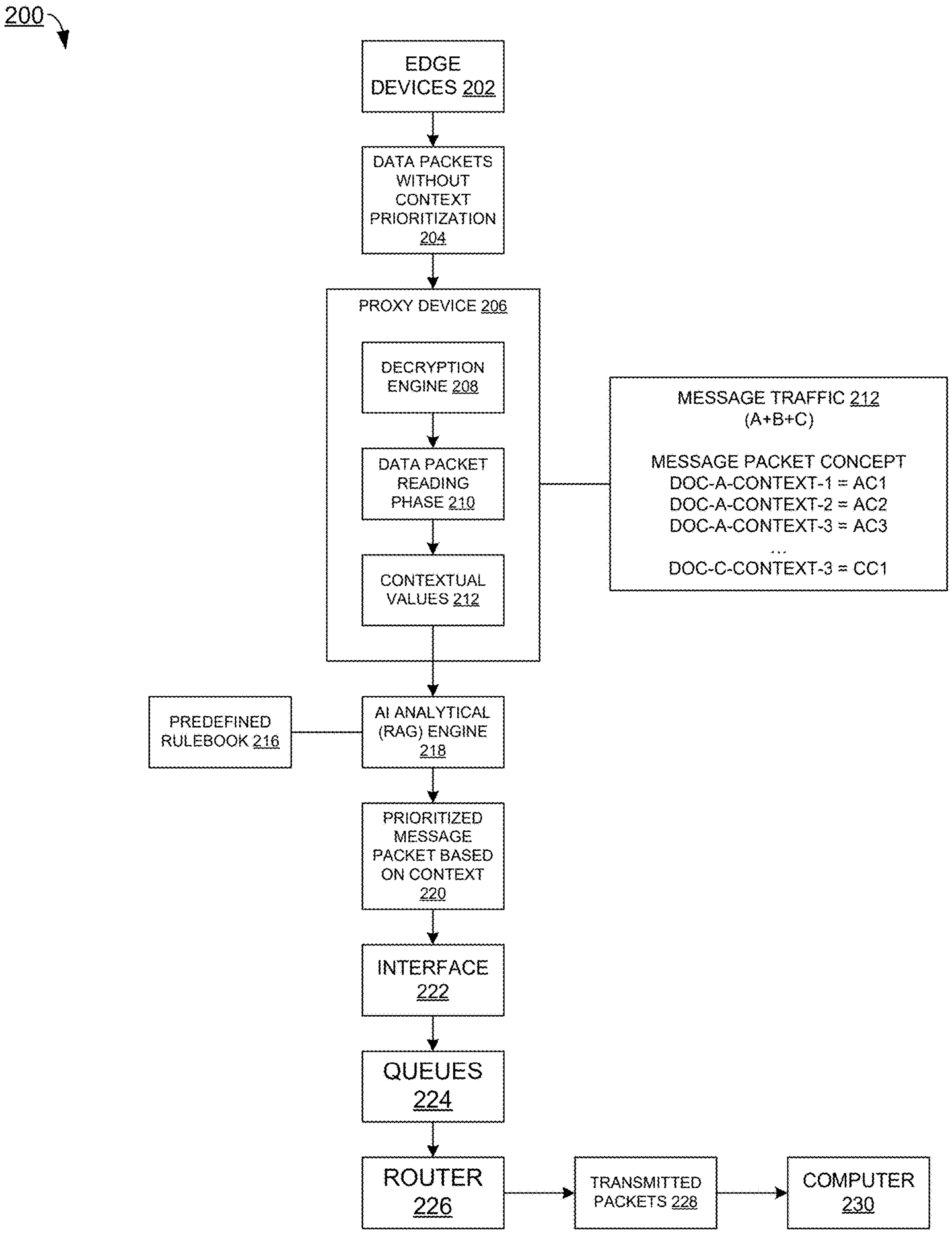
FIG. 2 illustrates an example that can facilitate context-based analysis for data packet prioritization, in accordance with an embodiment of this disclosure.

FIG. 2 illustrates an example 200 that can facilitate context-based analysis for data packet prioritization, in accordance with an embodiment of this disclosure. In some examples, part(s) of example 200 can be implemented by part(s) of system architecture 100 of FIG. 1 to facilitate context-based analysis for data packet prioritization.

Example 200 comprises edge devices 202, data packets without context prioritization 204, proxy device 206, decryption engine 208, data packet reading phase 210, contextual values 212, message packet concept 214, pre-defined rulebook 216, AI analytical (RAG) engine 218, prioritized message packet based on context 220, interface 222, queues 224, router 226, transmitted packets 228, and computer 230.

Figure 3:
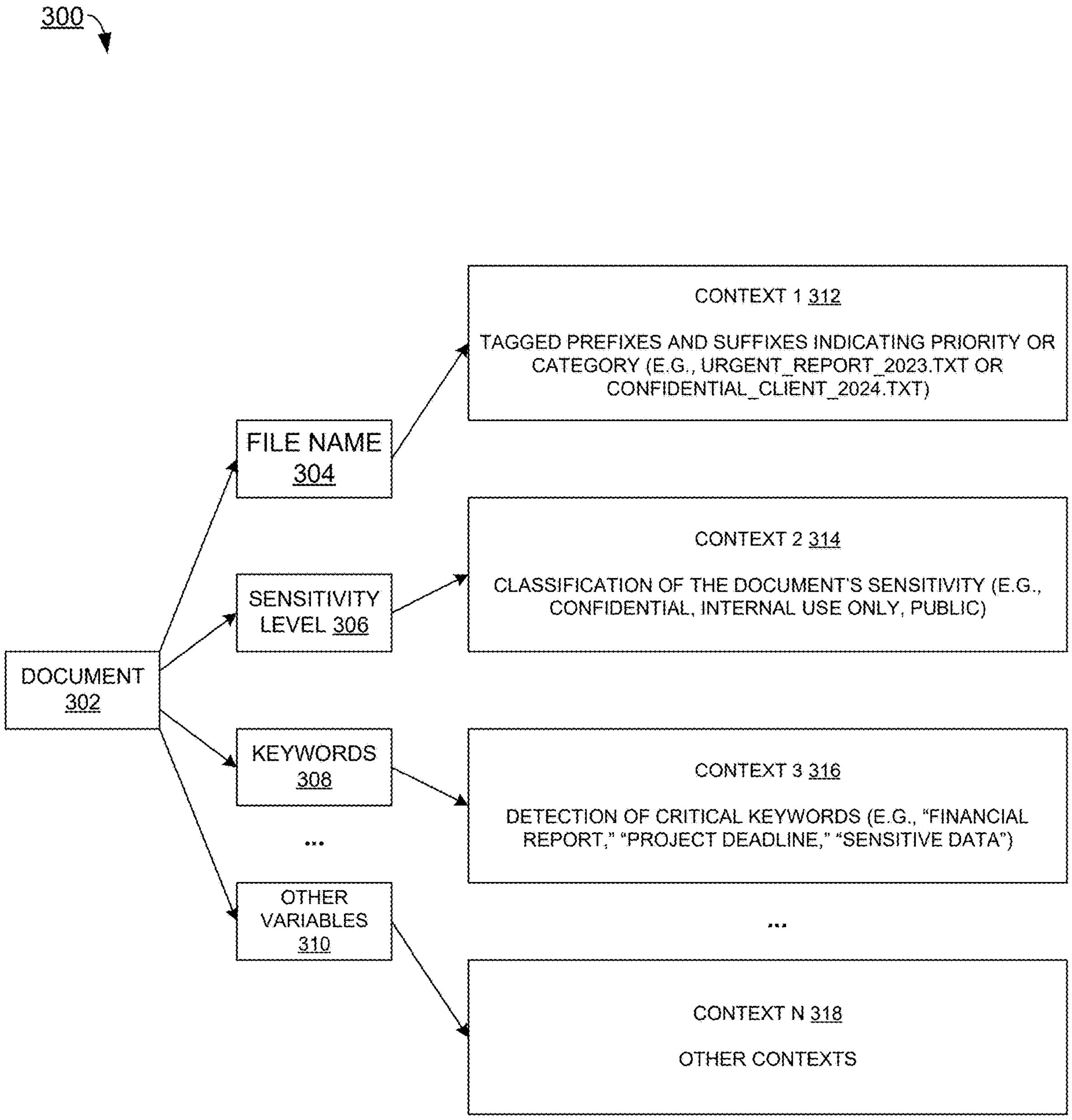
FIG. 3 illustrates another example that can facilitate context-based analysis for data packet prioritization, in accordance with an embodiment of this disclosure.

FIG. 3 illustrates another example 300 that can facilitate context-based analysis for data packet prioritization, in accordance with an embodiment of this disclosure. In some examples, part(s) of example 300 can be implemented by part(s) of system architecture 100 of FIG. 1 to facilitate context-based analysis for data packet prioritization.

Example 300 comprises document 302, file name 304, sensitivity level 306, keywords 308, other variables 310, context 1 312, context 2 314, context 3 316, and context N 318.

Context 1 312 can comprise tagged prefixes and suffixes indicating priority or category (E.g., URGENT_REPORT_2023.txt or CONFIDENTIAL_CLIENT_2024.txt)

Context 2 314 can comprise a classification of the document's sensitivity (E.g., confidential, internal use only, public).

Context 3 316 can comprise a detection of critical keywords (e.g., "financial report," "project deadline," "sensitive data").

Context N 318 can comprise other contexts.

Figure 4:
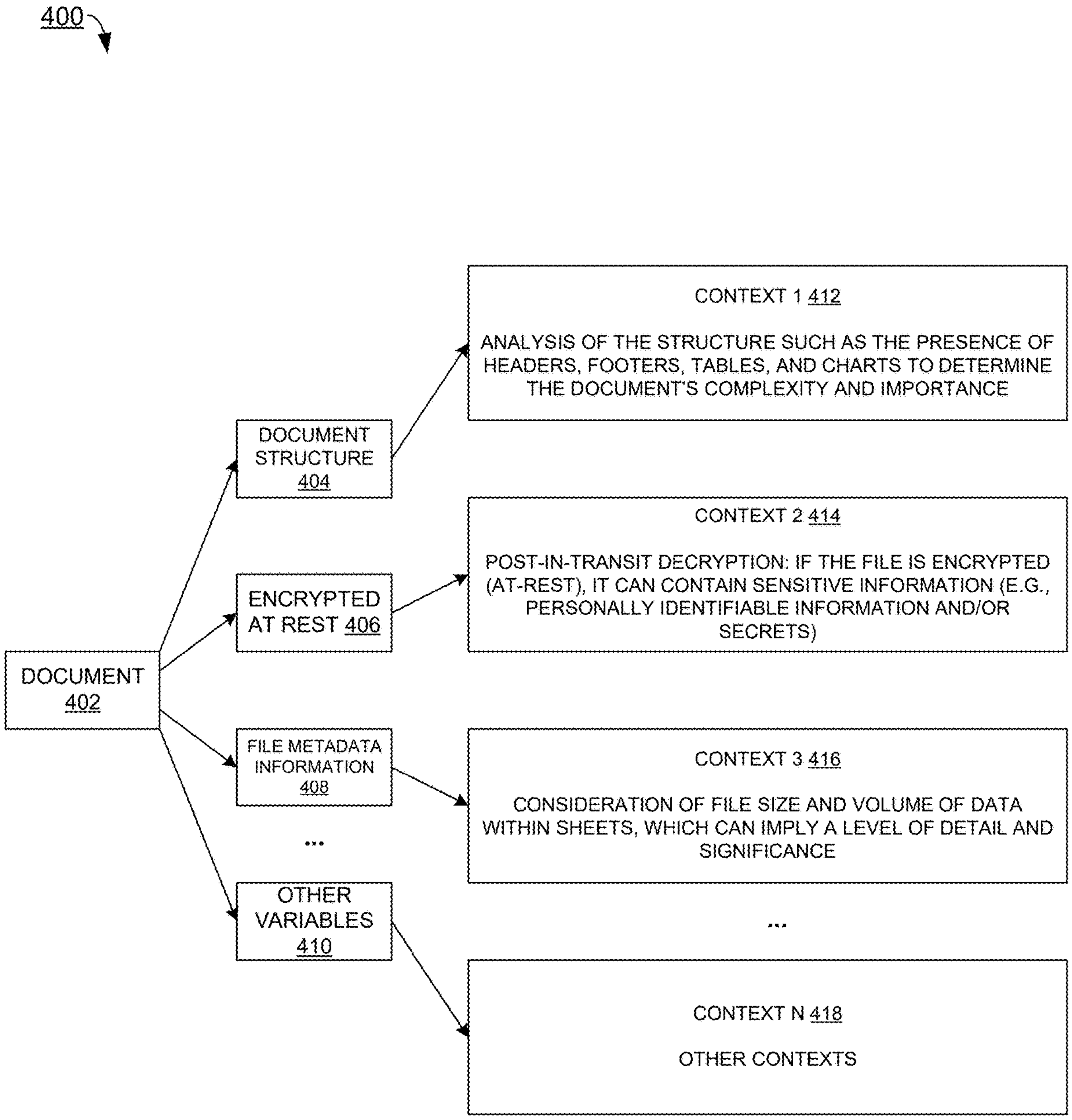
FIG. 4 illustrates another example that can facilitate context-based analysis for data packet prioritization, in accordance with an embodiment of this disclosure.

FIG. 4 illustrates another example 400 that can facilitate context-based analysis for data packet prioritization, in accordance with an embodiment of this disclosure. In some examples, part(s) of example 400 can be implemented by part(s) of system architecture 100 of FIG. 1 to facilitate context-based analysis for data packet prioritization.

Example 400 comprises document 402, document structure 404, encrypted at rest 406, file metadata information 408, other variables 410, context 1 412, context 2 414, context 3 416, and context N 418.

Context 1 412 can comprise an analysis of the structure such as the presence of headers, footers, tables, and charts to determine the document's complexity and importance.

Context 2 414 can comprise a post-in-transit decryption: if the file is encrypted (at-rest), it can contain sensitive information (E.g., personally identifiable information and/or secrets)

Context 3 416 can comprise a consideration of file size and volume of data within sheets, which can imply a level of detail and significance Context N 418 can comprise other contexts.

Figure 5:
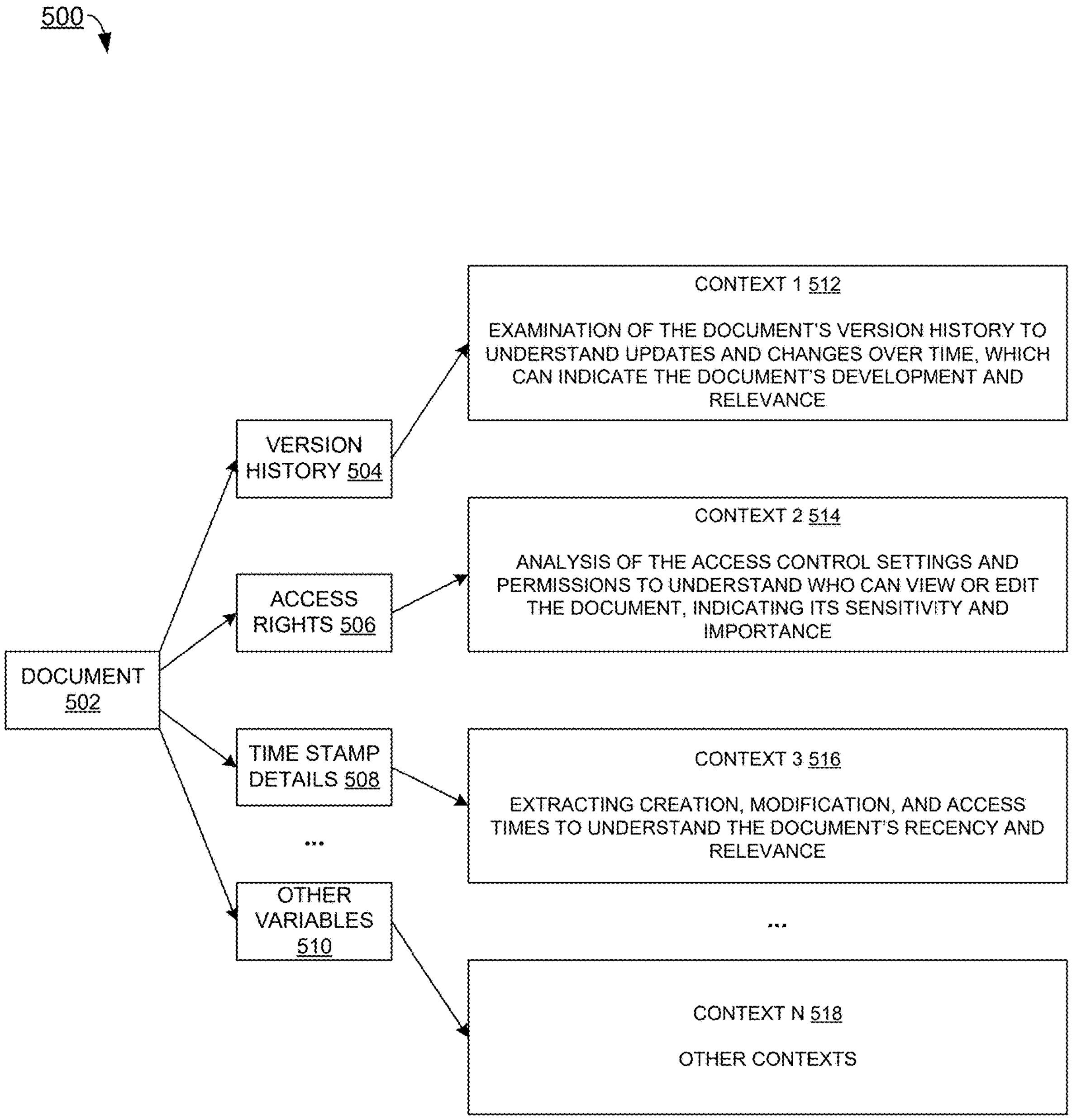
FIG. 5 illustrates another example that can facilitate context-based analysis for data packet prioritization, in accordance with an embodiment of this disclosure.

FIG. 5 illustrates another example 500 that can facilitate context-based analysis for data packet prioritization, in accordance with an embodiment of this disclosure. In some examples, part(s) of example 500 can be implemented by part(s) of system architecture 100 of FIG. 1 to facilitate context-based analysis for data packet prioritization.

Example 500 comprises document 502, version history 504, access rights 506, time stamp details 508, other variables 510, context 1 512, context 2 514, context 3 516, and context N 518.

Context 1 512 can comprise an examination of the document's version history to understand updates and changes over time, which can indicate the document's development and relevance.

Context 2 514 can comprise an analysis of the access control settings and permissions to understand who can view or edit the document, indicating its sensitivity and importance Context 3 516 can comprise extracting creation, modification, and access times to understand the document's recency and relevance.

Context N 518 can comprise other contexts.

Example Procss Flows

FIG. 6 illustrates another example process flow that can facilitate context-based analysis for data packet prioritization, in accordance with an embodiment of this disclosure. In some examples, one or more embodiments of process flow 600 can be implemented by system architecture 100 of FIG. 1, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of process flow 700 of FIG. 7, process flow 800 of FIG. 8, and/or process flow 900 of FIG. 9.

Process flow 600 begins with 602, and moves to operation 604.

Operation 604 depicts receiving a group of data packets originated by at least one edge device. Using the example of FIG. 2, these can be data packets without context prioritization 204.

After operation 604, process flow 600 moves to operation 606.

Operation 606 depicts decrypting respective data packets of the group of data packets, to reconstruct a file that is represented by the group of data packets. Continuing with the example of FIG. 2, this can be performed by decryption engine 208 and data packet reading phase 210.

After operation 606, process flow 600 moves to operation 608.

Operation 608 depicts extracting a contextual value of the file. Continuing with the example of FIG. 2, this can be at least one contextual value of contextual values 212.

In some examples, the contextual value comprises a structure of the file.

In some examples, the file comprises a document, and the structure of the document comprises a header of the document, a footer of the document, a table of the document, a chart of the document, a complexity of the document, or a body of the document.

In some examples, the contextual value comprises an indication that the file is encrypted at rest.

In some examples, the contextual value comprises metadata of the file.

In some examples, the metadata comprises a file size of the file, or a volume of data within the file, and wherein the file comprises a spreadsheet.

These can be contextual values similar to those depicted with respect to FIG. 4.

After operation 608, process flow 600 moves to operation 610.

Operation 610 depicts inputting the respective contextual values and a defined rulebook to a retrieval-augmented generation system, wherein the defined rulebook comprises rules applicable to traffic routing in a human-readable format, and wherein the retrieval-augmented generation system outputs a priority for transmission of the group of data packets. Continuing with the example of FIG. 2, this retrieval-augmented generation system can be AI analytical (RAG) engine 218.

In some examples, the rules applicable to traffic routing in the human-readable format omit a first reference to a port, omit a second reference to an Internet Protocol address, or omit a third reference to a user account. That is, the rules can be of the form "prioritize work traffic during business hours," rather than rules that specify technical details, such as which network ports to prioritize traffic for.

After operation 610, process flow 600 moves to operation 612.

Operation 612 depicts transmitting the group of data packets to a destination based on the priority and the defined rulebook. Continuing with the example of FIG. 2, this can be performed by router 226.

In some examples, the transmitting of the group of data packets to the destination based on the priority comprises inserting the respective data packets into at least one priority queue, where a router transmits the respective data packets based on the at least one priority queue. Continuing with the example of FIG. 2, the one priority queue can be queues 224, and the router can be router 226.

In some examples, the group of data packets are destined for a router, the decrypting, the extracting, and the inputting are performed by a proxy device that intercepts the group of data packets, and wherein the transmitting is performed by the router. Continuing with the example of FIG. 2, the proxy device can be proxy device 206, and the router can be router 226.

After operation 612, process flow 600 moves to 614, where process flow 600 ends.

Figure 7:
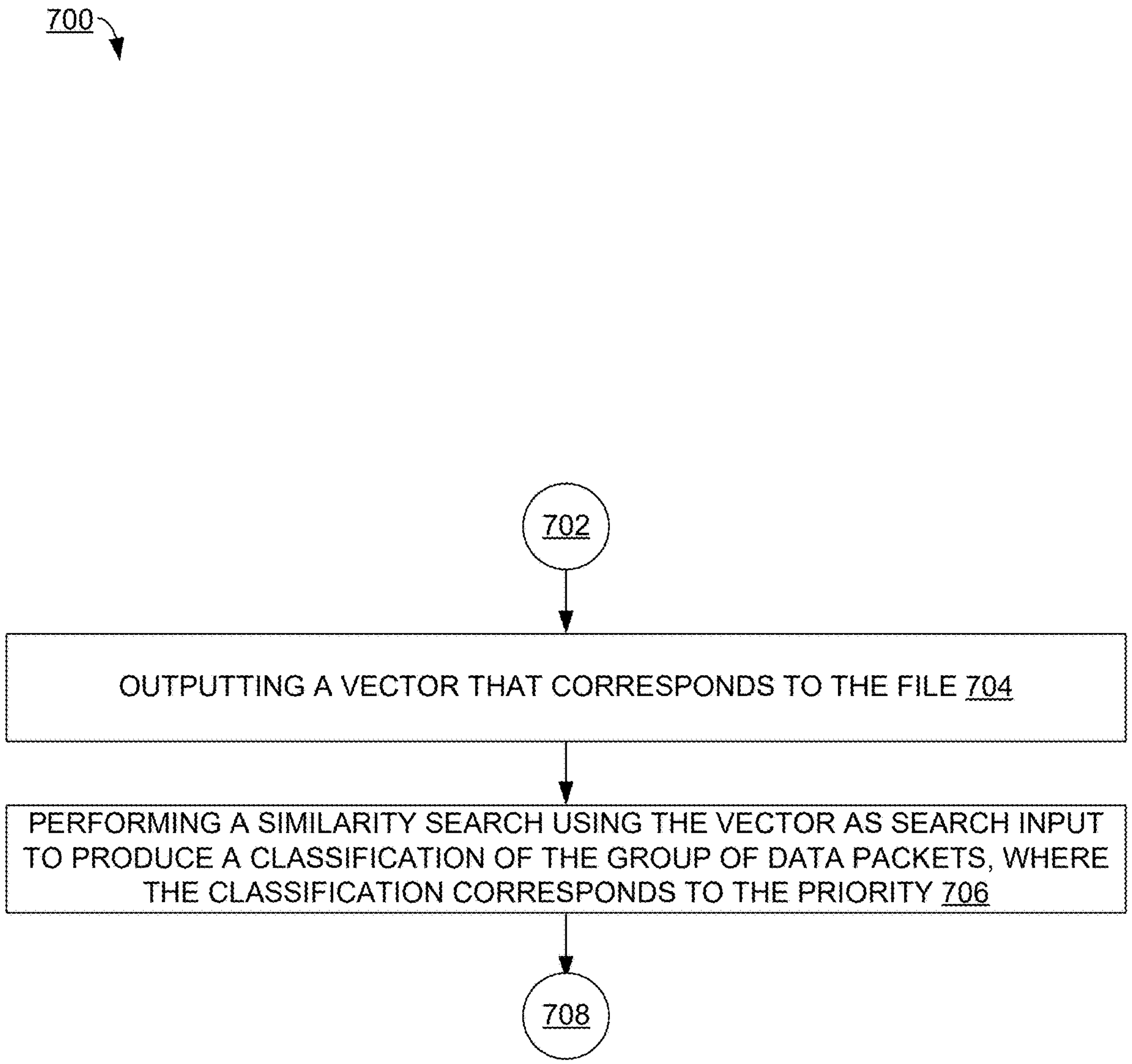
FIG. 7 illustrates another example process flow that can facilitate context-based analysis for data packet prioritization, in accordance with an embodiment of this disclosure.

FIG. 7 illustrates another example process flow that can facilitate context-based analysis for data packet prioritization, in accordance with an embodiment of this disclosure. In some examples, one or more embodiments of process flow 700 can be implemented by system architecture 100 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of process flow 600 of FIG. 6, process flow 800 of FIG. 8, and/or process flow 900 of FIG. 9.

Process flow 700 begins with 702, and moves to operation 704.

Operation 704 depicts outputting a vector that corresponds to the file. This can be performed by a retrieval-augmented generation system.

After operation 704, process flow 700 moves to operation 706.

Operation 706 depicts performing a similarity search using the vector as search input to produce a classification of the group of data packets, where the classification corresponds to the priority. That is, input data (e.g., audio/video/text) can be input into a RAG, which outputs a vector (as in operation 704). A similarity search can be performed on the vector against a vector database to classify the vector (and, correspondingly, information contained within the data packets).

After operation 706, process flow 700 moves to 708, where process flow 700 ends.

Figure 8:
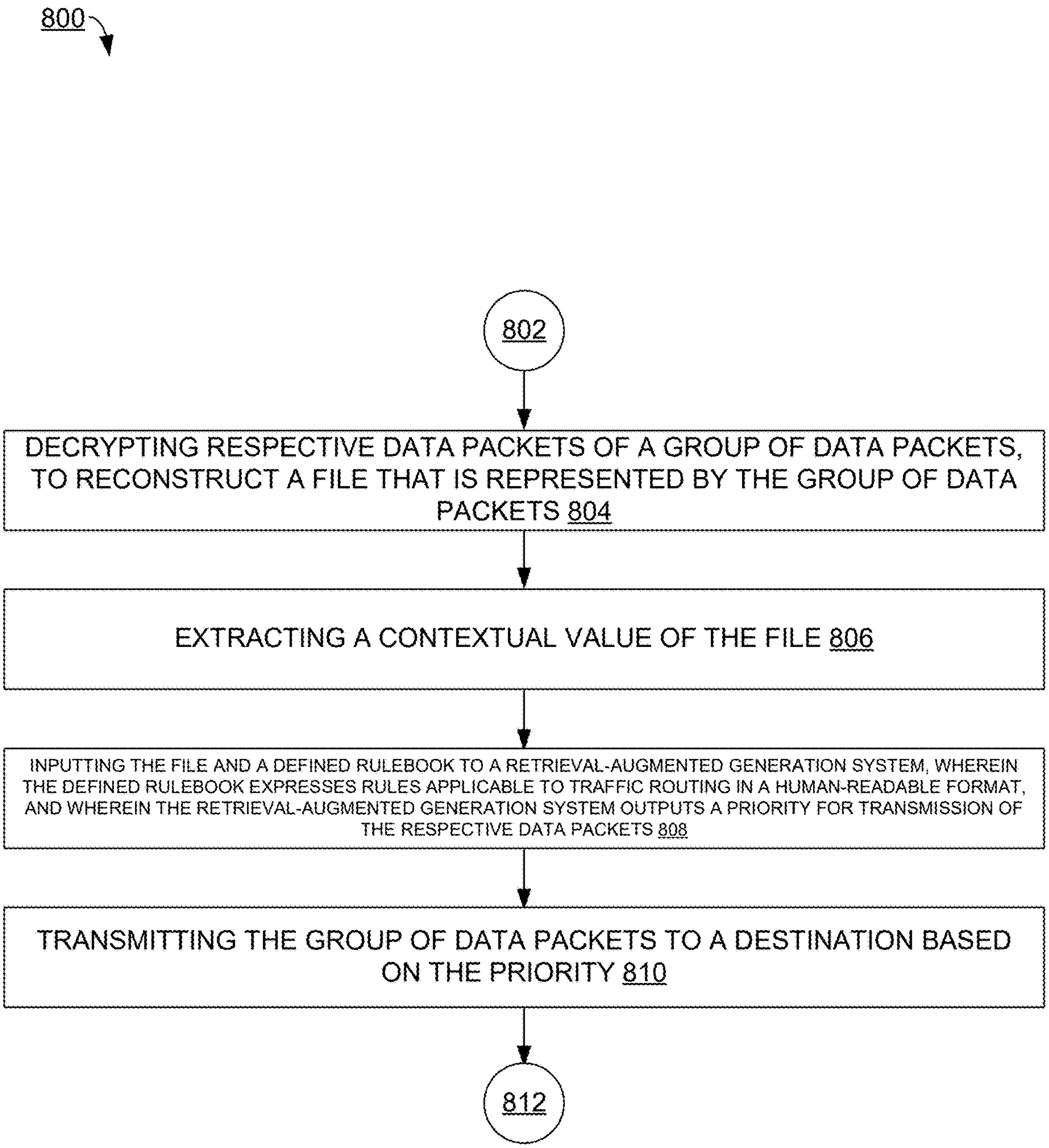
FIG. 8 illustrates another example process flow that can facilitate context-based analysis for data packet prioritization, in accordance with an embodiment of this disclosure.

FIG. 8 illustrates another example process flow that can facilitate context-based analysis for data packet prioritization, in accordance with an embodiment of this disclosure. In some examples, one or more embodiments of process flow 800 can be implemented by system architecture 100 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of process flow 600 of FIG. 6, process flow 700 of FIG. 7, and/or process flow 900 of FIG. 9.

Process flow 800 begins with 802, and moves to operation 804.

Operation 804 depicts decrypting respective data packets of a group of data packets, to reconstruct a file that is represented by the group of data packets. In some examples, operation 804 can be implemented in a similar manner as operations 604-606 of FIG. 6.

After operation 804, process flow 800 moves to operation 806.

Operation 806 depicts extracting a contextual value of the file. In some examples, operation 806 can be implemented in a similar manner as operation 608 of FIG. 6.

In some examples, the contextual value comprises a file name of the file.

In some examples, the contextual value comprises a prefix of the file name, a suffix of the file name, and wherein the prefix or the suffix indicates a priority of the document or a category of the file.

In some examples, the contextual value comprises a sensitivity level of the file.

In some examples, the contextual value comprises a keyword contained within the file.

These can be contextual values similar to those depicted with respect to FIG. 3.

After operation 806, process flow 800 moves to operation 808.

Operation 808 depicts inputting the file and a defined rulebook to a retrieval-augmented generation system, wherein the defined rulebook expresses rules applicable to traffic routing in a human-readable format, and wherein the retrieval-augmented generation system outputs a priority for transmission of the respective data packets. In some examples, operation 808 can be implemented in a similar manner as operation 610 of FIG. 6.

After operation 808, process flow 800 moves to operation 810.

Operation 810 depicts transmitting the group of data packets to a destination based on the priority. In some examples, operation 810 can be implemented in a similar manner as operation 612 of FIG. 6.

After operation 810, process flow 800 moves to 812, where process flow 800 ends.

FIG. 9 illustrates another example process flow that can facilitate context-based analysis for data packet prioritization, in accordance with an embodiment of this disclosure. In some examples, one or more embodiments of process flow 900 can be implemented by system architecture 100 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of process flow 600 of FIG. 6, process flow 700 of FIG. 7, and/or process flow 800 of FIG. 8.

Process flow 900 begins with 902, and moves to operation 904.

Operation 904 depicts extracting a contextual value of a file that is reconstructed from a group of data packets, wherein the group of data packets are encrypted in a course of transmitting the group of data packets. In some examples, operation 904 can be implemented in a similar manner as operations 604-608 of FIG. 6.

In some examples, the contextual value of comprises a version history of the file.

In some examples, the contextual value comprises an access right to the file.

In some examples, the contextual value comprises time stamp of the file.

In some examples, the time stamp indicates a creation time of the file, a modification time of the file, or an access time of the file.

These can be contextual values similar to those depicted with respect to FIG. 5.

After operation 904, process flow 900 moves to operation 906.

Operation 906 depicts inputting the contextual value to a retrieval-augmented generation system, and a defined rulebook to the retrieval-augmented generation system, wherein the defined rulebook expresses rules for traffic routing in a human-readable format, and wherein the retrieval-augmented generation system outputs a priority for transmitting the respective data packets. In some examples, operation 906 can be implemented in a similar manner as operation 610 of FIG. 6.

After operation 906, process flow 900 moves to operation 908.

Operation 908 depicts transmitting the group of data packets to a destination based on the priority. In some examples, operation 908 can be implemented in a similar manner as operation 612 of FIG. 6.

After operation 908, process flow 900 moves to 910, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of computer system 102 and/or user computer 106 of FIG. 1.

In some examples, computing environment 1000 can implement one or more embodiments of the process flows of FIGS. 6-9 to facilitate context-based analysis for data packet prioritization.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 (containing disk 1022) can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1016 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory that stores executable instructions that, when executed by the at least one processor, facilitate performance of operations, comprising:
receiving a group of data packets originated by at least one edge device;
decrypting respective data packets of the group of data packets, to reconstruct a file that is represented by the group of data packets;
extracting a contextual value of the file;
inputting the contextual value and a defined rulebook to a retrieval-augmented generation system, wherein the defined rulebook comprises rules applicable to traffic routing in a human-readable format, and wherein the retrieval-augmented generation system outputs a priority for transmission of the group of data packets; and
transmitting the group of data packets to a destination based on the priority and the defined rulebook.

2. The system of claim 1, wherein the retrieval-augmented generation system outputs a vector that corresponds to the file, and wherein the operations further comprise:
performing a similarity search using the vector as search input to produce a classification of the group of data packets, and wherein the classification corresponds to the priority.

3. The system of claim 1, wherein the transmitting of the group of data packets to the destination based on the priority comprises:
inserting the respective data packets into at least one priority queue, wherein a router transmits the respective data packets based on the at least one priority queue.

4. The system of claim 1, wherein the group of data packets are destined for a router, wherein the decrypting, the extracting, and the inputting are performed by a proxy device that intercepts the group of data packets, and wherein the transmitting is performed by the router.

5. The system of claim 1, wherein the rules applicable to traffic routing in the human-readable format omit a first reference to a port, omit a second reference to an Internet Protocol address, or omit a third reference to a user account.

6. The system of claim 1, wherein the contextual value comprises a structure of the file.

7. The system of claim 6, wherein the file comprises a document, and wherein the structure of the document comprises a header of the document, a footer of the document, a table of the document, a chart of the document, a complexity of the document, or a body of the document.

8. The system of claim 1, wherein the contextual value comprises an indication that the file is encrypted at rest.

9. The system of claim 1, wherein the contextual value comprises metadata of the file.

10. The system of claim 9, wherein the metadata comprises a file size of the file, or a volume of data within the file, and wherein the file comprises a spreadsheet.

11. A method, comprising:
decrypting, by a system comprising at least one processor, respective data packets of a group of data packets, to reconstruct a file that is represented by the group of data packets;
extracting, by the system, a contextual value of the file;
inputting, by the system, the file and a defined rulebook to a retrieval-augmented generation system, wherein the defined rulebook expresses rules applicable to traffic routing in a human-readable format, and wherein the retrieval-augmented generation system outputs a priority for transmission of the respective data packets; and
transmitting, by the system, the group of data packets to a destination based on the priority.

12. The method of claim 11, wherein the contextual value comprises a file name of the file.

13. The method of claim 12, wherein the contextual value comprises a prefix of the file name, a suffix of the file name, and wherein the prefix or the suffix indicates a priority of the file or a category of the file.

14. The method of claim 11, wherein the contextual value comprises a sensitivity level of the file.

15. The method of claim 11, wherein the contextual value comprises a keyword contained within the file.

16. A non-transitory computer-readable medium comprising instructions that, in response to execution, cause a system comprising at least one processor to perform operations, comprising:
extracting a contextual value of a file that is reconstructed from a group of data packets, wherein the group of data packets are encrypted in a course of transmitting the group of data packets;
inputting the contextual value to a retrieval-augmented generation system, and a defined rulebook to the retrieval-augmented generation system, wherein the defined rulebook expresses rules for traffic routing in a human-readable format, and wherein the retrieval-augmented generation system outputs a priority for transmitting the group of data packets; and
transmitting the group of data packets to a destination based on the priority.

17. The non-transitory computer-readable medium of claim 16, wherein the contextual value of comprises a version history of the file.

18. The non-transitory computer-readable medium of claim 16, wherein the contextual value comprises an access right to the file.

19. The non-transitory computer-readable medium of claim 16, wherein the contextual value comprises time stamp of the file.

20. The non-transitory computer-readable medium of claim 19, wherein the time stamp indicates a creation time of the file, a modification time of the file, or an access time of the file.

* * * * *